United States Patent Office 3,320,728
Patented May 23, 1967

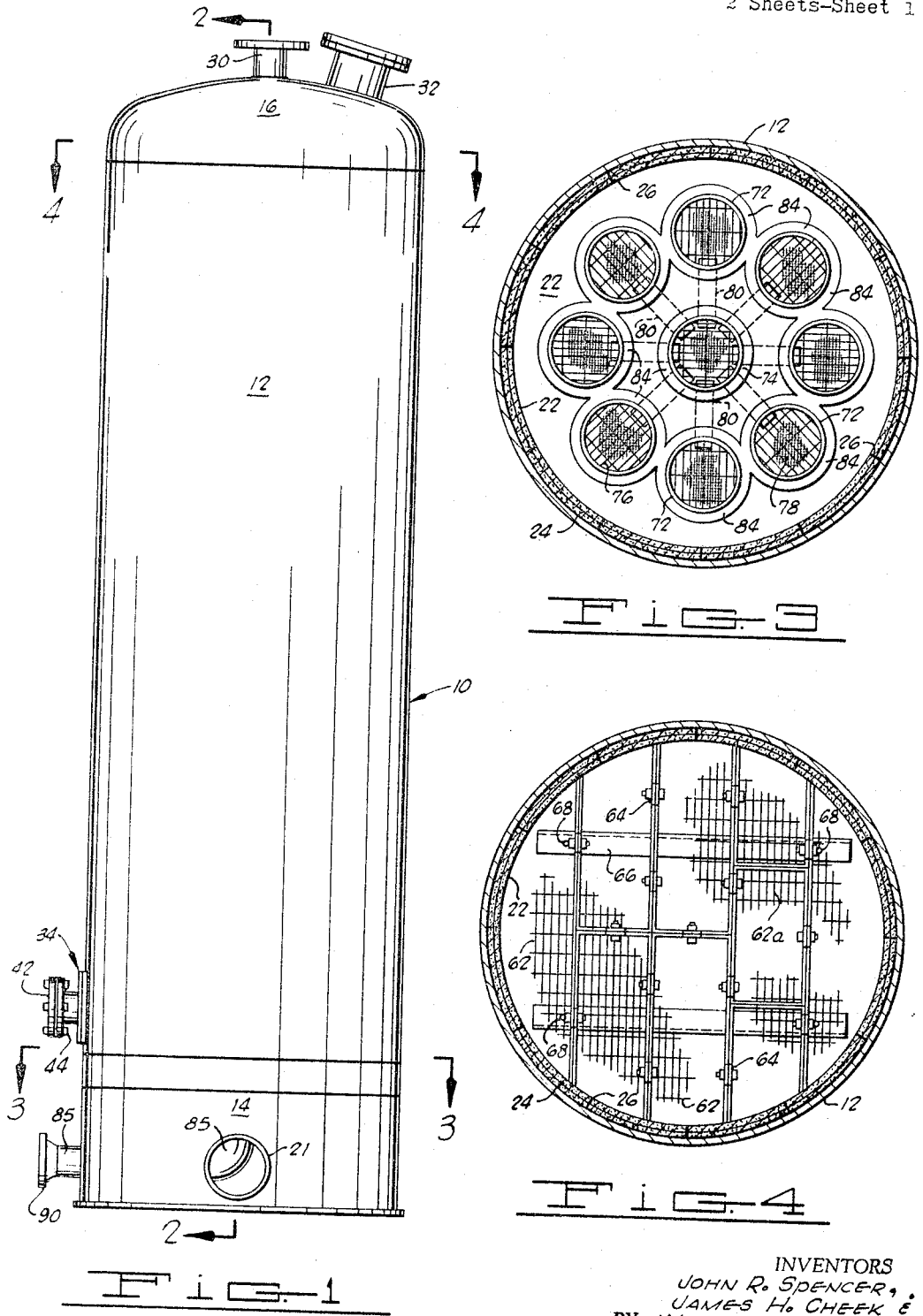

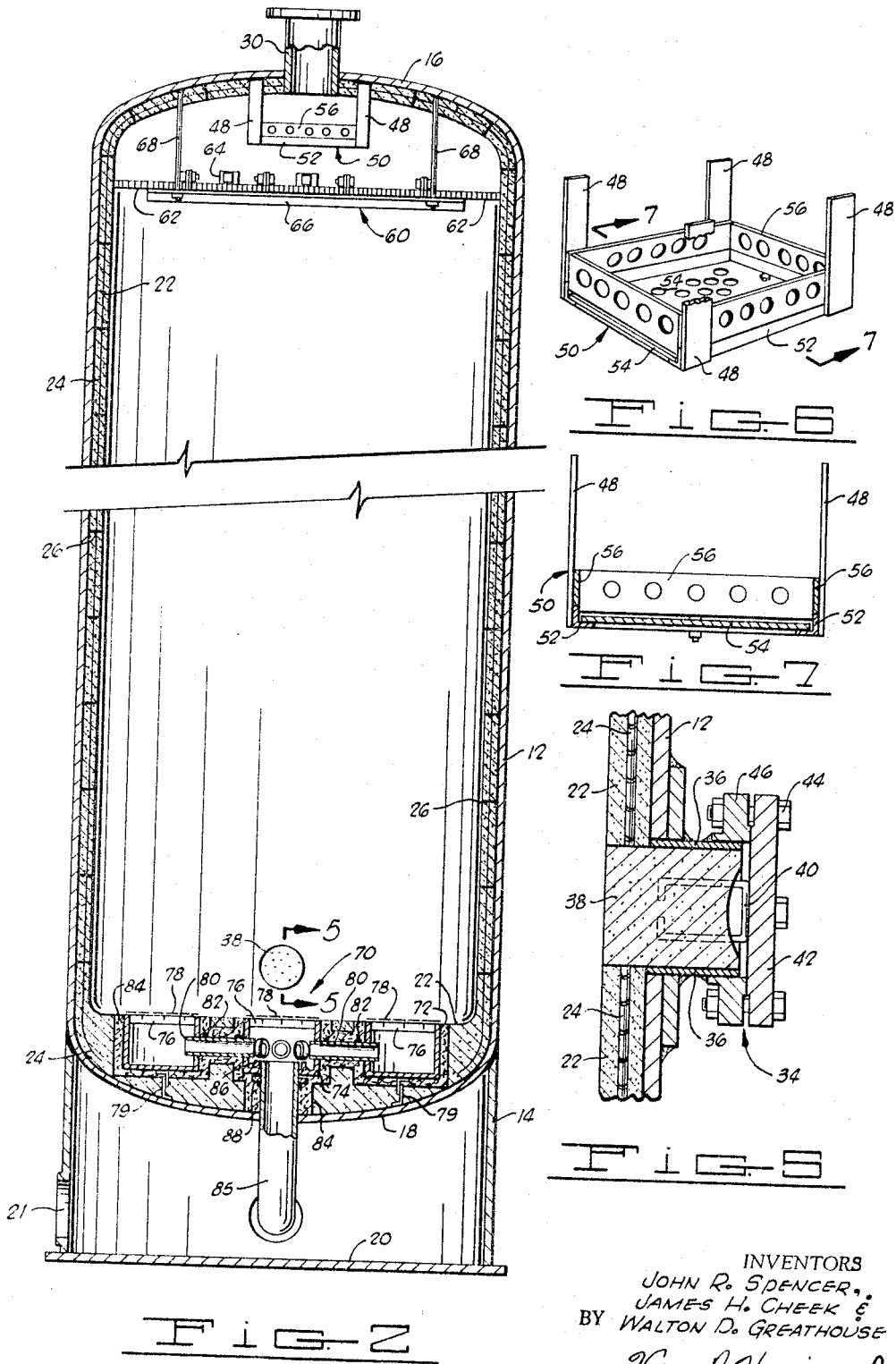

3,320,728
ADSORPTION COLUMN
John R. Spencer, James H. Cheek, and Walton D. Greathouse, Houston, Tex., assignors to Continental Oil Company, Ponca City, Okla., a corporation of Delaware
Filed Nov. 19, 1964, Ser. No. 412,543
15 Claims. (Cl. 55—387)

This invention relates to an adsorption column for separating at least one constituent of a gaseous stream from the remainder of the constituents by adsorption on a suitable adsorbent material. More particularly, the present invention relates to an improved support for a bed of solid adsorbent material in an adsorption column.

A structure widely used in various chemical processes and particularly in the refining of petroleum is an adsorption column or tank which generally comprises an elongated, usually cylindrical chamber containing a solid material which is capable of adsorbing a selected constituent from a gaseous mixture passed through the column. The column will generally, of course, include ducts or ports for introducing the gaseous mixture to one end of the column, and for removing at least a portion of the gaseous mixture from the other end of the column after it has passed through the packing of adsorbent material.

The tanks or chambers which confine the solid adsorbent material are sometimes quite large, and the mass or weight of the adsorbent material contained therein is correspondingly great. Therefore, a strong supporting structure is required in the bottom of the chamber to support the adsorbent packing, and problems occasionally arise in preventing the solid adsorbent from clogging or choking outlet conduits entering the bottom of columns containing a large amount of the adsorbent material. Moreover, a problem is frequently engendered by the operation of such adsorption columns at high temperatures for the purpose of extracting hydrocarbons or other materials from high temperature vapors or gases in that the thermal variation which may occur within the column from time to time results in high mechanical stresses being set up in welds, joints, and connections of ducting and piping as a result of the expansion and contraction of interconnected members. These stresses can become of sufficient magnitude to cause fractures in seams, or severance of joints and connections so that gases being passed through the column are permitted to leak, parts of the adsorbent solid are lost, or other detrimental results occur which necessitate taking the unit off stream and dismantling it for extended periods in order to repair the damage which has thus occurred. One of the most frequent occurrences of defective joints as a result of thermally induced stresses is at the joints by which the discharge ducts or piping from the adsorption column are connected to the plating or flooring which underlies and supports the bed of adsorbent material.

The present invention provides a novel and improved bed support structure for the bed of solid adsorbent material used in the adsorption column, which support structure is especially well suited for use in adsorption columns which are of relatively large size and operated from time to time under high temperature conditions with the column being permitted to cool between such operations. Broadly described, the bed support structure of the invention comprises a plurality of gas-receiving receptacles which are positioned in the lower end of the adsorption column and each of which has an open, gas-receiving upper end; perforate closure means extending across the open upper end of each of said gas-receiving receptacles for supporting the solid adsorbent material thereabove, and for receiving gas from the solid adsorbent material; gas removal or discharge conduit means interconnecting the gas-receiving receptacles and extending out of the lower end of the column, said gas removal conduit means including pipes interconnecting said receptacles and slidably extending into each of said receptacles to facilitate movement of the receptacles and pipes relative to each other as a result of thermal changes; and a solid material positioned in the lower end of the column around the gas-receiving receptacles and their interconnecting pipes for supporting the solid adsorbent material thereabove in the column and for retaining the gas-receiving receptacles and pipes in position.

In a preferred embodiment of the invention, the gas-receiving receptacles are generally cylindrically shaped can structures which include a centrally located manifold can which is interconnected to all of the other gas-receiving cans by piping which slidably enters each of the cans. In the preferred embodiment, each of the gas-receiving receptacles and the interconnecting piping are wrapped with a compressible, thermally insulating material such as fibrous glass, and the solid material which is positioned in the lower end of the column around the gas-receiving receptacles and pipes includes, in addition to the fibrous glass wrapping, a castable material which is poured or sprayed into place around the fibrous glass wrapped elements to set up to a hardened condition and provide a strong support for the solid adsorbent material in the column.

By reason of the provision of the described structure, adsorption columns constructed in accordance with the invention can withstand greater thermal stresses, induced by intermittent operation of the column at high temperatures, without developing leaks or undesirable fractures at joints and seams. The effective operating life of the columns is substantially extended, and the extent of maintenance required and accompanying downtime on the column are substantially reduced.

From the foregoing description of the invention, it will be perceived that the present invention provides a novel adsorption column construction which includes an improved bed support structure capable of withstanding without malfunction, operation of the column over a wide range of temperatures over extended periods of time.

Another object of the invention is to provide a relatively inexpensive bed support structure for use in an adsorption column of the type used for extracting from a high temperature gas stream, one or more of the components of the stream.

An additional object of the present invention is to provide a bed support structure for use in an adsorption column, which support structure is relatively simple mechanically and can be easily constructed and repaired when required.

Other objects and advantages of the invention will become apparent as the following detailed description thereof is read in conjunction with the accompanying drawings which illustrate the invention.

In the drawings:

FIGURE 1 is a view in elevation of the adsorption column constructed in accordance with the present invention.

FIGURE 2 is a sectional view taken along line 2—2 of FIGURE 1.

FIGURE 3 is a sectional view taken transversely through the adsorption column along line 3—3 as illustrated in FIGURE 1.

FIGURE 4 is a transverse sectional view through the adsorption column taken along line 4—4 FIGURE 1.

FIGURE 5 is a sectional view taken along line 5—5 of FIGURE 2.

FIGURE 6 is an isometric view of the diffuser assembly mounted in the top of the adsorption column of the invention.

FIGURE 7 is a sectional view taken along line 7—7 of FIGURE 6.

Referring now to the drawings in detail, and particularly to FIGURE 1, an adsorption column constructed in accordance wtih the present invention is designated generally by reference character 10 and includes an elongated, generally cylindrical metallic shell 12. The cylindrical shell 12 is supported on a generally cylindrical base pedestal 14 which may be formed integrally with the shell 12 or may be constructed as illustrated in FIGURE 2 as a separate cylindrical member which is welded or otherwise suitably secured to the shell 12. In the illustrated construction, the cylindrical shell 12 is closed by generally concave upper and lower end portions, 16 and 18, respectively. The bottom end portion 18 of the shell 12 is spaced vertically from a floor or bed plate 20 of the base pedestal 14, and a suitable access opening 21 is provided in the vertical side wall of the pedestal.

The generally cylindrical shell 12 is lined with a suitable castable insulation material designated generally by reference character 22. By a castable material is meant a refractory material having a bonding agent added which can be cast in place and which sets up in a hardened condition. Typically, a suitable mixture of Portland cement and comminuted perlite can be used as the castable material employed in the adsorption column of the invention. The castable material may be positioned on the internal surface of the shell 12 in any suitable manner, such as by spraying with a gunnite gun, and is retained in place by suitable concrete reinforcing wire mesh 24 which is extended between studs 26 projecting inwardly from the generally cylindrical shell 12.

As best illustrated in FIGURE 1, the concave upper end portion 16 of the cylindrical shell 12 is provided with a flanged, gas inlet fitting 30 and with a manway 32 facilitating access to the interior of the column. At the lower end of the generally cylindrical shell 12, a clean-out port 34 is provided for the purpose of permitting the solid adsorbent packing of the column to be removed when desired. As best illustrated in FIGURE 5, the clean-out port 34 includes a short section of pipe 36 which projects outwardly from the cylindrical shell 12 and slidably surrounds a plug 38 of the castable material which snugly fits a complementary opening through the castable material 22 which lines the shell 12. A suitable handle 40 is provided to facilitate removal of the plug 38 of castable material, and a blind flange 42 is secured by bolts 44 to a circumferential flange 46 welded to the pipe 36. When the blind flange 42 is removed from the circumferential flange 46, the plug 38 of castable material can be pulled outwardly to provide access to the interior of the column 10 so that the adsorbent material can be removed therefrom.

Suspended from the concave upper end portion 16 of the column 10 by four supporting rods 48, and positioned immediately below the gas inlet 30 is a diffuser assembly designated generally by reference character 50. The diffuser assembly 50 is illustrated in detail in FIGURES 6 and 7 and includes three angle iron supports 52 extending between the supporting rods 48 and forming a three-sided tray for supporting an apertured horizontal diffuser plate 54. Apertured side diffuser plates 56 rest on the horizontal top edges of the angle iron supports 52 and extend between the four support rods 48. It will be noted that the angle iron is omitted on one side of the diffuser assembly 50 so that the horizontal diffuser plate 54 can be slipped into position on the three angle irons 52 from the side of the diffuser assembly which faces the manway 32.

Extending transversely across the adsorption column 10 at a level below the diffuser assembly 50 is a distribution tray designated generally by reference character 60. The distribution tray 60 comprises a plurality of sections of grating 62 which are bolted together in the assembled form illustrated in FIGURES 2 and 4 by means of mating vertically projecting lugs 64. The assembled grating sections 62 are supported in the adsorption column 10 upon a pair of spaced, horizontally extending support bars or rods 66 which are each bolted to the lower ends of a pair of vertical bars 68 welded or otherwise suitably secured at their upper ends to the concave upper end portion 16 of the shell 12. One of the grating sections 62, which has been designated by reference character 62a in FIGURE 4, is positioned between the horizontal support bars 66 and directly beneath the manway 32 so that it can be removed to permit access from the top of the adsorption column to the interior thereof below the distribution tray 60.

In the lower portion of the adsorption column 10 is positioned the bed support structure 70 for supporting the packing or bed of adsorbent material disposed within the column. The bed support structure 70 includes a plurality of gas-receiving receptacles or cans 72 which are disposed in a generally circular array with a manifold can 74 located in the center of the circular array. In the illustrated embodiment of the invention, collection cans 72 and manifold can 74 are generally cylindrical in configuration and are provided with a disc-shaped grate structure 76 extending across the top thereof. A relatively fine mesh screen 78 covers each of the respective grate structures 76. Each of the gas collection cans 72 in the circular array is secured to and supported upon the concave bottom closure member 18 by suitable brackets 79.

Extending through, and radially outwardly from, the side of the manifold can 74 are a plurality of collection pipes 80 which interconnect the manifold can 74 with each of the gas collection cans 72 disposed in the circular array around the manifold can. The collection pipes 80 extend through the side wall of each of the gas collection cans and it will be noted in referring to FIGURE 2 that each of the pipes 80 is somewhat longer than the distance between each of the gas collection cans 72 and the manifold can 74. The collection pipes 80 are slidably disposed through the walls of the respective gas collection cans 72 and the manifold can 74 rather than being rigidly secured thereto for a purpose hereinafter described. Each pipe 80 carries a pair of spaced weld beads 82 which limit the sliding movement of the pipe between its respective gas collection can 72 and the manifold can 74. All of the cans and collection pipes 80 are wrapped or coated with a wrapping of a compressible, thermally insulating material 84, such as fibrous glass, having a thickness of about one-half inch. As will be perceived in referring to FIGURE 2, however, the opened upper ends of the cans remain exposed and are not covered with the fibrous glass.

After the portion of the adsorbent bed support structure 70 which has thus far been described has been assembled, the castable material 22 is positioned beneath and on the sides of the cans 72 and 74, and around the pipes 80 to the level of the open upper ends of the cans as illustrated in FIGURE 2. A gas discharge conduit 85 extends slidably through the bottom of the manifold can 74 and extends through, and is welded to, the concave lower end portion 18 of the shell 12. The upper end of the gas discharge conduit 85 carries a movement limiting sleeve 86 which is spaced along the conduit from a circumferential flange 88 secured therearound so as to permit limited sliding movement of the discharge conduit relative to the manifold can 74. Below the concave end portion 18 of the shell 12, the gas discharge conduit 85 is bent through an angle of 90° to extend horizontally through the side wall of the cylindrical pedestal 14. A suitable gas discharge fitting 90 is connected to the end of the gas discharge conduit 85 outside the adsorption column 10. That portion of conduit 85 between the lower end portion 18 and the manifold can 74 is also wrapped with a compressible, thermally insulating material, such as glass fiber.

In the construction of the adsorption column 10, the bed support structure 70 is first assembled in the bottom of the column by workmen who have entered the column through the manway 32. With the gas collection cans 72, manifold can 74, interconnecting collection pipes 80 and gas discharge conduit 85 in position and wrapped with the fibrous glass insulation in the manner described, the castable material 22 is then disposed on the inside wall of the column by pouring or by spraying techniques well understood in the art. The rods 48 and 68 for supporting diffuser assembly 50 and distribution tray 60, respectively, have, of course, been secured to the metallic concave upper closure portion 16 prior to the emplacement of the castable material. The several grating sections 62 of the distribution tray 60 are then bolted in place above, and supported by, the support bars 66, except for the trap door section 62a of the grating structure. The assembling workmen can then pass through the opening remaining for the trap door section 62a of the distribution tray 60 and out through the manway 32. The horizontal apertured diffuser plate 54 can be inserted in the diffuser assembly 50 by passing it through the manway 32. The adsorbent packing for the column 10, which can typically be pelletized activated carbon, can be introduced to the column prior to placing the trap door grating section 62a in place so that the column is completely filled with the bed of adsorbent material from the bed support structure 70 to the distribution tray 60. When the packing of the column 10 has been completed, the trap door grating section 62a of the distribution tray 60 is inserted through the manway 32 and is bolted in place to complete the construction of the column.

When the column 10 has been connected to the gaseous plant stream which it is desired to subject to the adsorbent action of the column, gas enters the column through the gas inlet 30 and is diffused radially in the column by the diffuser assembly 50. It is further distributed evenly for passage through the bed of adsorbent material by the distribution tray 60. After passing through the entire bed of adsorbent material, the gas enters the gas collection cans 78 and the manifold can 74. Gas from the collection cans 78 is channeled inwardly into the manifold can 74 through the collection pipes 80, and from the manifold can 74, the gas is removed from the column 10 via the gas discharge conduit 85.

Over extended periods of operation, followed by, or preceded by, shutdowns in operation, the metal elements in the bed support structure 70 are subjected to substantial variations in thermal environment, and therefore undergo a significant degree of expansion and contraction. Such expansion and contraction are accommodated by the novel construction of the bed support structure 70 of the present invention in that the metallic portions of the bed support structure are slidably interconnected, and are separated from the castable material by the compressible fibrous glass. Thus, as the cans and/or pipes 80 undergo expansion or contraction, no substantial stress is exerted on the castable material 22 which surrounds these elements due to the interpositioning therebetween of the fibrous glass insulation or wrapping 84. Moreover, the development of thermal hot spots at some particular location on the metallic cans 72 and 74 or the collection pipes 80 is avoided due to the thermal insulating effect of the fibrous glass wrapping. Finally, the fact that the collection pipes 80 and the gas discharge conduit 85 are slidably, rather than rigidly, connected to their respective can structures permits these elements to expand or contract without causing fracture or cracking of the cans, or undesirable rupture of permanent, rigid joints or connections.

From the foregoing description of the invention, it will be perceived that a novel and highly useful adsorption column is proposed by the present invention, which column is characterized by a longer and relatively more trouble-free operating life than columns of this type as previously constructed. Moreover, the manner in which the adsorption column of the invention is constructed permits it to be more easily serviced and maintained, and permits the adsorbent packing material to be more quickly changed in the column.

Although a preferred embodiment of the invention has been hereinbefore described in order to provide an example of the manner in which the invention can be practiced, various equivalent structures can be substituted for those which have been depicted and described without departure from the basic principles which underlie the invention. All such modifications and changes in the structure which perform in substantially the same manner and are thus generally equivalent to the exemplary structure herein described are therefore deemed to be circumscribed by the spirit and scope of the invention except as the same may be necessarily limited by the appended claims or reasonable equivalents thereof.

We claim:

1. In an adsorption column of the type having an elongated container for enclosing a solid adsorbent material, an improved adsorbent bed support structure comprising a plurality of gas-receiving receptacles positioned in one end of the column, having open, gas-receiving upper ends positioned in a common horizontal plane extending transversely through the column and having a layer of compressible, thermally insulating material around the sides and bottom of each of said gas-receiving receptacles;

perforate closure means extending across the open, upper ends of each of said gas-receiving receptacles for supporting the solid adsorbent material thereabove;

gas removal conduit means interconnecting said gas-receiving receptacles and extending out of said one end of the column, said gas removal conduit means including pipes interconnecting said receptacles and slidably extending into each of said receptacles to facilitate movement of the receptacles and pipes relative to each other as a result of thermal changes; and a solidified, castable material positioned in said one end of the column around said pipes, receptacles and thermally insulating material and having a horizontal upper surface generally coplanar with the upper ends of said receptacles for supporting the said adsorbent material thereabove.

2. The adsorbent support structure claimed in claim 1 wherein said receptacles include a circular array of circumferentially spaced receptacles, and a manifold receptacle centrally located with respect to said circular array of receptacles, and wherein said pipes extend generally horizontally from said manifold receptacle to each of the receptacles in said circular array, each of said pipes having one of its ends extending slidably into one of said receptacles in said circular array, and having its other end extending slidably into said manifold receptacle.

3. The adsorbent bed support structure claimed in claim 1 wherein said perforate closure means includes a grate extending across the open, upper end of each of said gas-receiving receptacles; and a screen covering the grate over each of said receptacles.

4. The adsorbent support structure claimed in claim 2 wherein said gas removal conduit means is further characterized in including a gas discharge conduit extending through said one end of said column and passing slidably into said manifold receptacle.

5. The adsorbent support structure claimed in claim 4 wherein said solid material includes a layer of compressible, thermally insulating material around the sides and bottom of each of said receptacles, and around said pipes and said discharge conduit; and a solidified castable material filling said one end of the column to the horizontal level of the upper ends of said receptacles and surrounding said compressible, thermally insulating material.

6. The adsorbent support structure claimed in claim 5 wherein said compressible, thermally insulating material is fibrous glass.

7. An adsorption column, adapted to contain a solid, particulate adsorbent material, said column comprising in combination
a hollow, outer shell having upper and lower closed ends;
gas inlet means in the upper end of said shell;
gas discharge means extending upwardly, centrally through the closed lower end of said shell; and
gas collection means connected to said gas discharge means and including
a plurality of spaced, gas-receiving receptacles disposed in the lower end portion of said shell and opening upwardly in said shell for receiving gas moving from the upper end thereof toward the lower end thereof and having a layer of compressible, thermally insulating material around the sides of said receptacles;
pipes slidably interconnecting said gas-receiving receptacles to said gas discharge means and permitting free movement of said receptacles relative to each other and to said gas discharge means whereby said receptacles, pipes and discharge means can remain effectively interconnected despite variations in thermal stresses acting therein; and
a solidified, castable material positioned in the lower end portion of said hollow, outer shell around said pipes, receptacles, and said layer of thermally insulating material for retaining said pipes and receptacles in position relative to each other, and for supporting said solid adsorbent material thereabove.

8. An adsorption column as claimed in claim 7 wherein said gas-receiving receptacles include a circular array of circumferentially spaced receptacles and a manifold receptacle centrally located with respect to said circular array of receptacles, and wherein said pipes extend from said manifold receptacle to each of the receptacles in said circular array, each of said pipes having one of its ends extending slidably into one of said receptacles in said circular array and having its other end extending slidably into said manifold receptacle.

9. An adsorption column as claimed in claim 7 and further characterized to include a distribution grating extending transversely across the upper end portion of said shell for distributing evenly in said shell gas introduced to said shell through said gas inlet means.

10. An adsorption column as claimed in claim 7 and further characterized to include a gas diffuser assembly positioned across said gas inlet means inside said shell in the upper end portion thereof.

11. An adsorption column as claimed in claim 7 and further characterized to include perforate closure means extending across the upwardly facing openings in said gas-receiving receptacles for preventing entry of said solid adsorbent material into said receptacles.

12. An adsorption column for resolution of mixtures by adsorption on a solid particulate material comprising an elongated, hollow container having an upper end and a lower end;
inlet means in the column for introducing a mixture to be resolved into the column above the lower end thereof;
discharge conduit means extending into the lower end of the column;
a plurality of effluent collecting receptacles in the lower end portion of said column;
pipes interconnecting said effluent collecting receptacles with said discharge conduit means and slidably mounted in said receptacles to permit movement of said receptacles relative to said discharge conduit means;
a compressible, thermally insulating material surrounding said receptacles and said pipes; and
solid, position-retaining means filling the lower end of said elongated hollow container and surrounding said pipes and partially surrounding said receptacles to permit effluent from the column to enter said receptacles while limiting the movement of said receptacles and pipes within said compressible, thermally insulating material.

13. In an adsorption column of the type having an elongated container for enclosing a solid adsorbent material, an improved adsorbent bed support structure comprising
a plurality of gas-receiving receptacles positioned in one end of the column and having open, gas-receiving upper ends positioned in a common horizontal plane extending transversely through the column;
perforate closure means extending across the open, upper ends of each of said gas-receiving receptacles for supporting the solid adsorbent material thereabove;
gas removal conduit means interconnecting said gas-receiving receptacles and extending out of said one end of the column, said gas removal conduit means including pipes interconnecting said receptacles and slidably extending into each of said receptacles to facilitate movement of the receptacles and pipes relative to each other as a result of thermal changes; and
a solid material positioned in said one end of the column around said pipes and receptacles and having a horizontal upper surface generally coplanar with the upper ends of said receptacles for supporting the said adsorbent material thereabove, said solid material including
a layer of compressible, thermally insulating material around the sides and bottoms of each of said receptacles and around said pipes; and
a solidified, castable mtaerial filling said one end of said column up to the level of the open, upper ends of said receptacles and surrounding said compressible, thermally insulating material.

14. An adsorption column, adapted to contain a solid, particulate adsorbent material, said column comprising in combination
a hollow, outer shell having upper and lower closed ends;
gas inlet means in the upper end of said shell;
gas discharge means extending upwardly, centrally through the closed lower end of said shell;
gas collection means connected to said gas discharge means and including
a plurality of spaced, gas-receiving receptacles disposed in the lower end portion of said shell and opening upwardly in said shell for receiving gas moving from the upper end thereof toward the lower end thereof;
pipes slidably interconnecting said gas-receiving receptacles to said gas discharge means and permitting free movement of said receptacles relative to each other and to said gas discharge means whereby said receptacles, pipes and discharge means can remain effectively interconnected despite variations in thermal stresses acting therein; and
a solid material positioned in the lower end portion of said hollow, outer shell around said pipes and receptacles for retaining said pipes and receptacles in position relative to each other, and for supporting said solid adsorbent material thereabove, said solid material including a layer of compressible, thermally insulating material around the closed portions of said receptacles and around said pipes; and a solidified, castable material filling the lower end portion of said shell and surrounding said compressible, thermally insulating material.

15. An adsorption column as claimed in claim 14 wherein said compressible, thermally insulating material is fibrous glass.

References Cited by the Examiner

UNITED STATES PATENTS

| | | | |
|---|---|---|---|
| 1,572,245 | 2/1926 | Quinn | 55—494 |
| 2,664,347 | 12/1953 | Rehrig | 23—288 |
| 2,833,631 | 5/1958 | Rossheim et al. | 23—288 |

REUBEN FRIEDMAN, *Primary Examiner.*

J. ADEE, *Assistant Examiner.*